Figure 1:
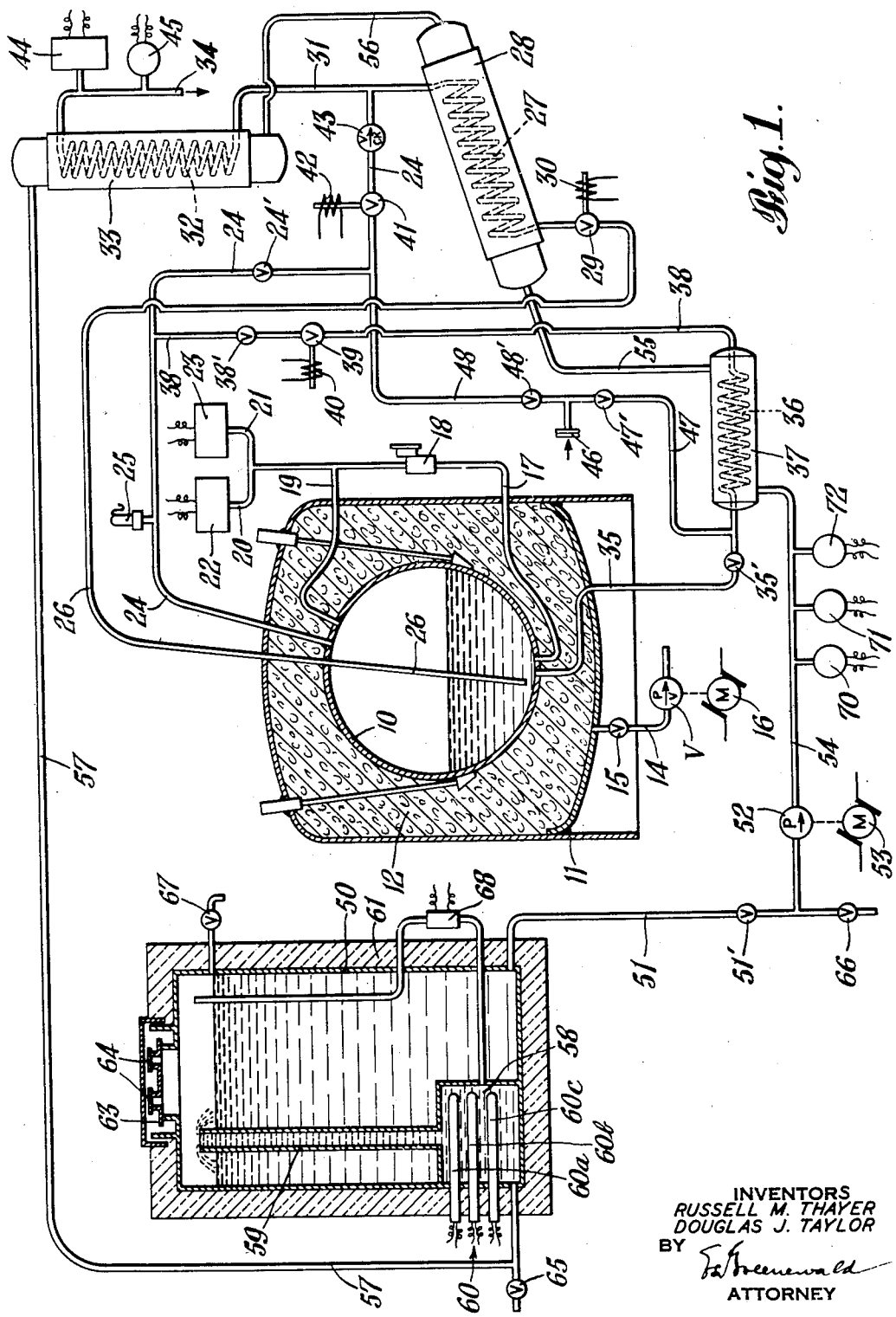

March 22, 1949.   R. M. THAYER ET AL   2,464,835
CONTROL SYSTEM FOR GAS SUPPLY APPARATUS
Filed Oct. 2, 1946   2 Sheets-Sheet 1

INVENTORS
RUSSELL M. THAYER
DOUGLAS J. TAYLOR
BY
ATTORNEY

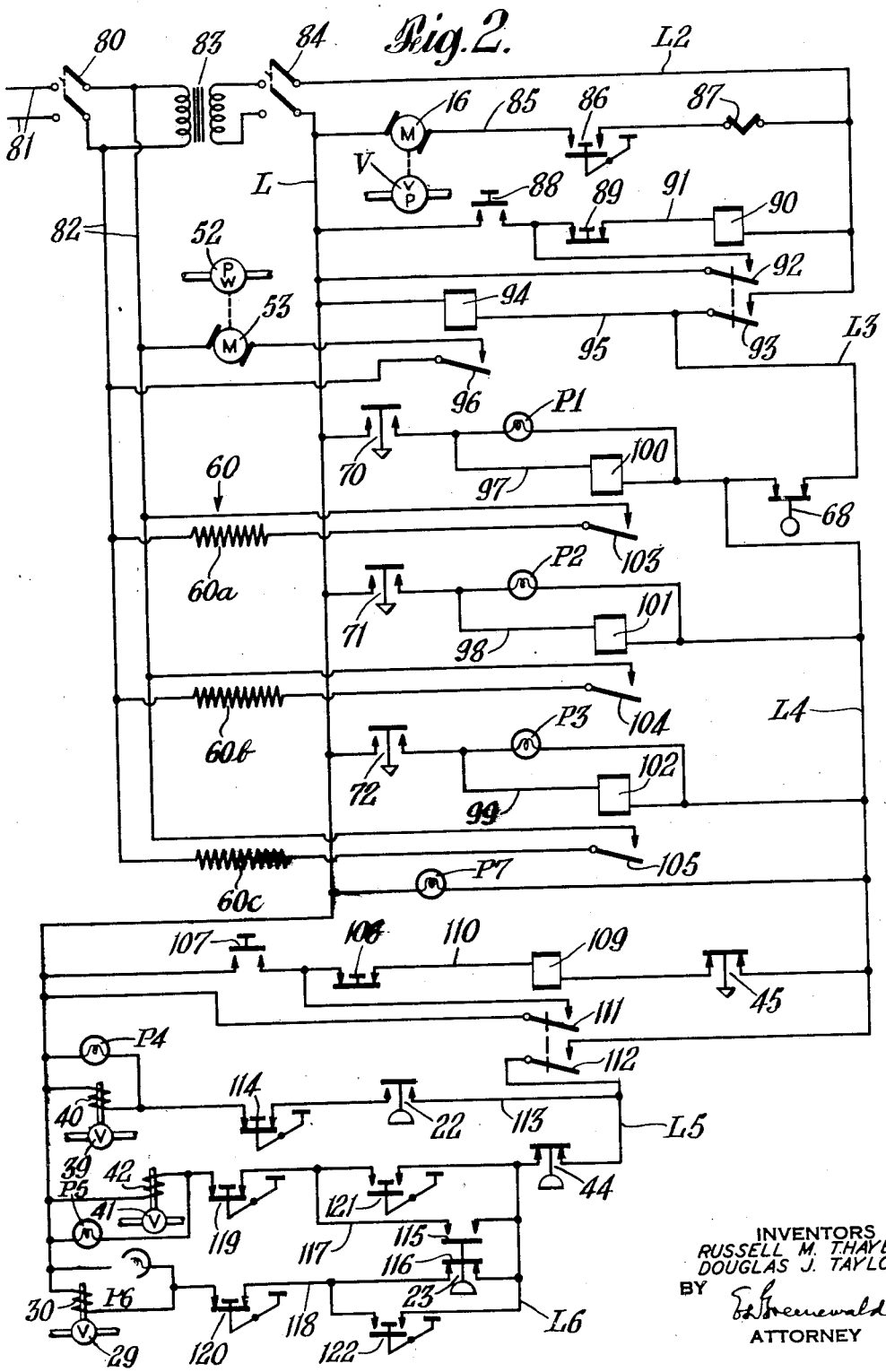

Patented Mar. 22, 1949

2,464,835

UNITED STATES PATENT OFFICE 2,464,835

CONTROL SYSTEM FOR GAS SUPPLY APPARATUS

Russell M. Thayer and Douglas J. Taylor, Buffalo, N. Y., assignors to The Linde Air Products Company, a corporation of Ohio Application October 2, 1946, Serial No. 700,764

17 Claims. (Cl. 62—1)

This invention relates to an automatic control for systems for dispensing a gas at a desired pressure and temperature generated from highly volatile liquefied gases having boiling points below 233° K. such as liquid oxygen or liquid nitrogen.

The supply of gaseous oxygen at substantially constant pressure to an industrial consumer's pipe line at rates of flow that vary considerably is effected by providing a store of liquefied gas in an insulated container connected to a system for vaporizing liquefied gas at a rate needed to supply the demand for gas. Such systems previously proposed employed gas pressure-operated valves for controlling delivery of liquid from the container to be vaporized, for delivery of gas from the container, and from gas receivers connected thereto which were employed to prevent excessive loss of gas during shut-down periods. Since the pressure responsive valves require substantial changes of pressure for effective operation, it is also necessary to provide pressure-reducing valves to maintain a substantially constant pipe line pressure. In a system such as that of U. S. Patent No. 1,943,047, withdrawal of both gas and liquid from the liquid container occurred simultaneously for a period during each change from gas withdrawal to liquid withdrawal and from liquid withdrawal to gas withdrawal. Also liquid withdrawal inherently causes gas withdrawal to occur.

With the control of the present invention there is instantaneous change-over from gas withdrawal to liquid withdrawal and vice versa, and liquid withdrawal does not act to cause gas withdrawal but a device is employed for maintaining substantially constant pressure in the container with a sensitivity such that pressure regulators are not needed. By providing a substantially constant head pressure and the supply of gas to the consumer's pipe line by gasification of liquid outside of the container, large variations of demand for gas are supplied without substantial fluctuations of pressure. Also excessive pressures in the container are rapidly reduced upon the resumption of operation after a shut-down period.

It is among the principal objects of the present invention to provide a control for a system that supplies gas at substantially constant pressure generated from a stored supply of liquefied gas which shall have the advantages set forth hereinabove.

Further objects of the present invention are to provide an automatic control system of the type described which prevents delivery of gas to a consumer's pipe line in the event that the temperature of the gas being delivered falls too low, which provides an alternative path of liquid discharge for use when desired, and which maintains the purity of liquefied gas in the container substantially constant.

A preferred embodiment of the automatic control according to the present invention is described as applied to the gas dispensing system described in the copending U. S. application of Odd A. Hansen, Serial No. 700,744, filed October 2, 1946.

These and other objects of the invention will be evident from the following description taken with the accompanying drawings, in which:

Fig. 1 is a diagrammatic view illustrating a preferred embodiment of a system for the storage and dispensing of a liquefied gas; and Fig. 2 is a view of a schematic diagram of electrical connections for automatic control of the apparatus illustrated in Fig. 1 according to the invention.

Referring particularly to Fig. 1, there is depicted an illustrative system for storing and dispensing gaseous material such as liquid oxygen, to which the principles of the invention are applied. A supply of liquid oxygen is held within an inner vessel 10, the walls thereof having sufficient thickness and strength to withstand a pressure which need be only moderately higher than the pressure of gaseous oxygen to be delivered to the consuming devices. An outer shell 11 gas-tightly surrounds the inner vessel 10, and provides an insulating space 12 which may preferably have a low apparent density filling of finely divided solid material such as magnesium carbonate and in addition, preferably is evacuated of gases to provide a powder-in-vacuum insulating means resistant to heat transfer to an exceptionally high degree. With a powder-in-vacuum type of insulation the pressure increase in container 10 during idle periods is very slow, and accordingly, the vessel may be designed for a lower maximum pressure and of lighter weight. When highly effective powder-in-vacuum insulation is employed, the outer shell 11 is made gastight and there is preferably provided a means for maintaining the vacuum high in order that the rate of heat leak into the liquid from the surrounding atmosphere may be kept very low so that the pressure rise in the vessel 10 is slow during periods of complete shut-down even though no gas receivers are provided in communication with the gas phase of the vessel 10, as was formerly customary. Suitable means for maintaining the vacuum may be provided in the form of a vacuum pump V, the inlet of which is connected to the interior of the shell 11 by the connection 14 controlled by a valve 15. The vacuum pump V may be driven by a directly connected electric motor 16.

The container is provided with gas and liquid conduits which pass from the inner vessel gastightly through the insulating space 12 to points outside of the shell 11. One such connection 17 extends from the bottom of the inner vessel 10 to the high pressure chamber of a liquid level indicating gauge 18. The low pressure side of the gauge 18 is in pressure communication with the upper part of the inner vessel 10 through a connection 19. The connection 19 also has branches 20 and 21 connected respectively to the pressure responsive elements in pressure switches 22 and 23, the functions of which will be hereinafter explained. One connection normally employable for gas phase withdrawal, is a conduit 24 connected with the top of the inner vessel 10 to which may be connected a safety release valve 25. Preferably, there are two independent connections for withdrawal of liquid from the vessel 10. One of these in the form of an eduction tube 26, is the main outlet for liquid, and this passes from a point near the bottom of the vessel 10 upwardly through the upper walls of the vessel 10 and shell 11. The eduction tube conduit 26 connects directly to the inlet end of a vaporizer coil 27 disposed within a heater jacket 28. Interposed in the conduit 26 is a flow-controlling valve 29 which is automatically operable by a solenoid 30. From the discharge end of the vaporizing coil 27, the oxygen vapor passes through a conduit 31 to a superheater coil 32 within a heating jacket 33. From the superheater coil 32 the warmed oxygen vapors are conducted directly to the customers' pipeline or consumers' apparatus by a service connection 34.

The other liquid outlet is a conduit 35 connected to the bottom of the inner vessel 10 and which forms part of a means for building and maintaining a pressure in the container 10 at a substantially constant value suitable for effecting delivery of the liquefied gas to the vaporizer 27 and superheater 32. Such means includes an external fluid circuit beginning with the conduit 35, which connects to the inlet end of a vaporizer coil 36 that is preferably surrounded by a heating jacket 37. A normally open stop-valve 35' preferably controls the conduit 35. The discharge end of the coil 36 is connected with the gas phase conduit 24 by a conduit 38. The conduit 38 is controlled by a valve 39 automatically operable by a solenoid 40. The conduit 38 also has interposed between the valve 39 and the conduit 24 a normally open stopvalve 38'. The vaporizer coil 36 is located below the level of the liquid in the vessel 10, and preferably somewhat below the lowest point on the bottom of the vessel 10. The pressure-building valve 39 may be located in either the gas or liquid line portions of the pressure-building circuit but is more conveniently located in the gas line 38. The valve 39 is made responsive to the pressure in the vessel 10 by an electric circuit hereinafter described so that when the pressure within the inner vessel 10 falls below an operating value not much different from the service pressure desired to be maintained in the conduit 34, the pressure switch 22 acts to energize the solenoid 40 to open the valve 39 which allows liquid to flow by gravity into the vaporizer coil 36. The vapor produced passes through conduits 38 and 24 into the gas space of the vessel 10 for building a non-equilibrium pressure therein. As soon as the pressure exceeds a slightly higher desired operating value, the pressure switch 22 opens to deenergize the solenoid 40 which allows the valve 39 to close.

If the pressure in the inner vessel 10 should exceed the desired operating value, gas is allowed to pass out through conduit 24 which has its outer end connected to the conduit 31, so that such gas may be warmed in the superheater 32 before it is passed to the service connection 34. The portion of conduit 24 nearest the conduit 31 has interposed therein a check valve 43 opening in the direction toward conduit 31. This portion of conduit 24 is also controlled by a control valve 41 which is operable by a solenoid 42. Also in conduit 24 between control valve 41 and the conduit 38 is a normally open stop valve 24'. Control valve 41 is operable by the action of the pressure switch 23 which, when the pressure in vessel 10 exceeds the operating value to be maintained, closes its circuit and energizes the solenoid 42, which opens the valve 41. The energizing of solenoid 42 by pressure switch 23 is arranged to simultaneously deenergize the solenoid 30 so that the valve 29 will close. Thus when the valve 41 is open, valve 29 is closed and vice versa, so that liquid and gas withdrawal cannot occur simultaneously to the delivery conduit 34, and the pressure within the inner vessel 10 is quickly reduced to the desired operating pressure. In pressure communication with the service connection 34 is a pressure switch 44 responsive to a pressure higher than the desired service pressure and arranged to be opened only when such higher pressure is exceeded. Normally, the pressure switch 44 is closed to permit pressure switch 23 to control valves 29 and 41. The service connection 34 also has interposed therein a temperature-sensitive element of a thermally operable switch 45 which functions to stop operation in the event that the temperature of the outflowing oxygen falls below a predetermined minimum, for example about −40° F.

Means for recharging the liquid vessel 10 is also provided and to avoid the use of additional conduits through the insulation space 12 that might increase the paths of heat leak, use is made of the conduits 24 and 35 for filling into the gas or liquid spaces of the vessel 10. To this end there is provided a filling connection 46 having branches 47 and 48 controlled by normally closed valves 47' and 48', respectively. The branch 47 connects with the liquid phase conduit 35 at a point between valve 35' and the vaporizer coil 36. Branch 48 joins the conduit 24 between the stop valve 24' and the control valve 41. Since liquid oxygen is ordinarily transported at or near atmospheric pressure and the vessel 10 operates at a substantially constant superatmospheric pressure, the charge of liquid must be forced in against the pressure. This is conveniently done by a pumping means and a metering device which are associated with the liquid oxygen transport that would be coupled to the connection 46. The liquid oxygen delivered is of lower temperature than the contents of the vessel 10, therefore by adjusting valves 47' and 48', the delivery is proportioned between the gas and liquid phases of the vessel 10, so that the pressure in the vessel 10 may remain substantially constant. Entry of the colder liquid oxygen through the conduit 24 into the gas space tends to effect condensation of gas in the gas space so that the pressure tends to fall even though the vessel is being filled with liquid. Entry of liquid through the conduit 35 tends merely to compress the gas in the gas space at a rate faster than it can condense at the liquid surface, and thus the pressure would tend to rise unless of course the flow from the service connection 34 were great enough to prevent such rise.

The heating jackets 37, 28, and 33 are preferably heated by a liquid heating medium which is circulated with sufficient rapidity to avoid any freezing thereof on the vaporizer coil. The heating liquid may be a water or a water solution, and preferably flows in a closed circuit which includes a storage tank 50 of substantial size to provide a reservoir of heat. From the bottom of the tank 50 a conduit 51 controlled by valve 51' conducts liquid to the inlet of a water circulating pump 52 which is driven by an electric motor 53. From the pump 52 the heated water is conducted by a conduit 54 to the vaporizer heating jacket 37. From jacket 37 a connection 55 passes the water to a jacket 28 from whence it flows through a connection 56 to the heating jacket 33. From heating jacket 33 the cooled liquid is passed through conduit 57 to a heating chamber 58 located within the tank 50. The heating chamber 58 preferably empties into the upper part of the tank 50 through a tube 59. Extending into the heating chamber 58 and immersed in the liquid therein are electric heating elements indicated generally at 60. Preferably there are three sets of elements shown diagrammatically at 60a, 60b, and 60c. The tank 50 is preferably surrounded by insulating jacket 61 to avoid excessive loss of heat to the atmosphere and also has an opening in its top covered by a suitable cap 63 provided with vents 64. A valve 65 may be provided for draining the heating chamber 58 and connected to the lower end of conduit 57. A valve 66 is connected to the conduit 51 for draining the tank 50.

The tank 50 is also provided with a trycock 67 at the desired normal level of the water in the tank. A float actuated switch 68 is preferably connected to be responsive to the liquid level in chamber 58 by tubes connecting its float chamber with the air space in the upper part of the tank and with the chamber 58. The liquid level switch 68 functions to prevent operation of the heating elements and oxygen delivery in the event that the liquid level in chamber 58 falls too low. Because of the heat storage provided by the mass of water in the tank 50, the electric heating elements 60 need be sufficient in size only to provide heat for vaporizing the average amount of oxygen delivered to the service conduit 34 during the day, but the volume of water is large enough so that when it is heated to a constant operating temperature, for example of about 123° F., a sufficient reserve of heat is provided to maintain an oxygen delivery rate of about four times the average for a period of at least one hour. The heating elements 60 are controlled by thermo-switches which have their sensitive elements immersed in the water. Preferably, there are three such thermo-switches 70, 71, and 72, mounted on the conduit 54, after the pump 52, respectively controlling the three heating elements 60a, 60b, and 60c.

The electric circuit for effecting automatic control of the valves in the system is diagrammatically shown in Fig. 2. This circuit has been simplified by omitting protecting devices such as fuses, and also by employing a 2-wire current supply. The same principles are involved obviously if the system were arranged for a 3-phase power supply, for example. A main switch 80 connects the power supply 81 to lines 82 and the primary of a transformer 83, the secondary of which is connected by a 2-pole switch 84 to a main control line L and a line L2. The motor 16 that drives the vacuum pump V is connected in series by a line 85 with a manual on-and-off switch 86 across the lines L and L2. Line 85 also has interposed therein a thermal overload release switch 87. Switch 86 is closed only when it is necessary to operate the vacuum pump for improving the vacuum in the insulation 12.

The water circulating pump motor 53 and operation of the heating elements 60 are controlled by push button switches 88 and 89 which are connected in series with a relay coil 90 by a line 91 across lines L and L2. Push button 89 is normally biased closed and is used for stopping operation and push button 88 is normally biased to open position. When push button 88 is momentarily closed, the relay coil 90 is energized and this closes a switch 92 which is shunted across the contacts of switch 88, thus when switch 88 is released the circuit for the coil 90 is maintained closed and coil 90 also holds closed a switch 93 that connects line L2 to a line L3. A relay coil 94 is connected between lines L and L3 by a line 95 and is thus energized by the closing of switch 93. Relay coil 94 closes a switch 96 which connects the motor 53 across the lines 82, thus starting the water pump 52 to operate. The liquid level switch 68 is normally closed when the correct height of liquid exists in the chamber 58 and maintains connection between line L3 and a line L4. The thermo-switches 70, 71, and 72 are connected by lines 97, 98, and 99, respectively, in series with three relay coils 100, 101, and 102 between line L and L4. The coils 100, 101, and 102 respectively close switches 103, 104, and 105, which, in turn connect the heating elements 60a, 60b, and 60c across the lines 82. The use of three temperature controls, provides greater flexibility of control. Thus, if the water temperature is less than, for example, 120° F., the temperature switch 70 closes and energizes a coil 100 which closes switch 103 to energize the heating element 60a. A pilot lamp P1 connected across the coil 100 will indicate operation of the heater element. If the temperature of the water falls to a lower value, such as 115° F., the thermo-switch 71 will close, energizing coil 101 which closes switch 104 to put heater element 60b into operation. If the water temperature should fall still lower to, for example, 110° F., thermo-switch 72 will close for energizing coil 102, closing switch 105, and putting heating element 60c into operation. As the temperature of the water rises, the temperature switches will be opened in the reverse order to cut off the heaters which they control and extinguishing the respective pilot lights shunted across the coils.

Operation of oxygen delivery is initiated by momentarily closing a push button switch 107. Normally open switch 107 is connected in series with a normally closed switch 108 usable to stop operation, a relay coil 109, and the contacts of the thermo-switch 45 which is also normally closed, all connected by line 110 between line L and line L4. Coil 109 closes switches 111 and 112, 111 being shunted across push button 107 so that the coil 109 will remain energized. Switch 112 connects line L4 with a line L5. A line 113 connected between L and L5 connects the pressure switch 22 in series with the coil of solenoid 40 which operates valve 39. A normally closed manually operated switch 114 is also interposed in the line 113, in order when desired to connect solenoid 40 into or to isolate it from the control circuit. The pressure switch 44 is connected between line L5 and a line L6. Pressure switch 44 is normally closed and opens only when the pressure in service conduit 34 exceeds the desired service pressure by a predetermined amount. Pressure switch 23 controls two sets of contacts, an upper set 115 which are normally disconnected and are connected only when the pressure in the vessel 10 exceeds the desired working value and a lower set 116. Contacts 116 are always closed unless the pressure in the vessel 10 exceeds the operating value by a small amount when the contacts 115 will be closed. Contacts 115 are connected in series with the coil 42 controlling valve 41 by a line 117 between line L and L6. Similarly, contacts 116 are connected in series with the coil 30 which controls valve 29 by a line 118 between line L and L6. In order to manually select withdrawal of liquid alone, or to permit liquid withdrawal through line 48 in an emergency, manual on-and-off switches 119 and 120 are interposed in lines 117 and 118, respectively and manually operated on-and-off switches 121 and 122 are shunted across the contacts 115 and 116, respectively. If desired, indicator or pilot lights P4, P5, and P6 may be shunted around the coils 40, 42, and 30, respectively, to indicate operation of the valves 39, 41, and 29.

As previously indicated, the system is prepared for operation by closing switches 80 and 84 and depressing the push button switch 88. The water pump thus operates continuously. Such operation can be stopped by momentarily opening push button switch 89. If the water level in the chamber 58 should be too low, the switch 68 will open, which prevents operation of the heating elements 60 and also prevents operation of the oxygen delivery circuit. For normal operation the positions of switches 114, 119, 120, 121, and 122 will be as shown, namely, 114, 119, and 120 are normally closed and switches 121 and 122 remain normally open. A pilot light P7 connected between line L and L4 will indicate whether switch 68 is closed and whether operation of the oxygen delivery circuit can be started. Push button 107 is then momentarily closed to initiate oxygen delivery, and operation from then on is automatic unless push button switch 108 is opened, or the thermo-switch 45 should open due to too low a temperature of the oxygen leaving the system through service conduit 34. Pressure switch 22 is then in control of the solenoid 40 of automatic valve 39 to keep the pressure within the vessel 10 at a predetermined substantially constant operating pressure, for example, within a small (1 p. s. i.) range of 125 p. s. i. gauge, which is only slightly higher than the service pressure, for example, 124 p. s. i. gauge, desired in the service conduit 34. If such pressure tends to exceed the operating value, valve 39 remains closed; but if the operating pressure tends to drop below the predetermined value, the switch 22 closes and opens valve 39 allowing liquid to flow into the pressure-building vaporizer 36, which then delivers gas through the line 24 into the vessel 10. The valves 38', 24', and 35' are open during normal operation. This pressure-building control can be made so sensitive that it is not necessary to provide pressure-reducing regulators in the service conduit 34, as was formerly necessary.

Under normal operating conditions the pressure switch 44 remains closed and, when the consumption of gas from service conduit 34 tends to reduce the pressure therein, the small difference in pressure, for example, about 1 p. s. i., between vessel 10 and service conduit 34 causes flow of liquid through the eduction tube 26 into the vaporizer 27 and superheater coil 32, which path provides the main source of oxygen for the service conduit 34. Normally valve 29 is open due to energization of solenoid 30 by the closed lower contacts 116 of switch 23. When the pressure in service conduit 34 tends to exceed the desired service pressure, the differential pressure causing flow is reduced resulting in less liquid vaporization. If, for example, after a shut-down period the pressure in vessel 10 should be at a higher value than the predetermined operating pressure, the pressure switch 23 will open the contacts 116, and close the contacts 115. In that event, if the service line pressure is reduced by consumption to keep the pressure switch 44 closed, the circuit through the solenoid 30 will be opened and the circuit to the solenoid 42 will be energized so that the valve 41 will open, and the gas will flow from the upper part of the vessel 10 through the conduit 24, conduit 31, and superheater 32 to the service conduit 34. Gas withdrawal through such gas phase passage will continue until the pressure in vessel 10 has reduced to the operating value when valve 41 will be closed by the opening of contacts 115 and valve 29 will be opened.

In some instances the gas to be supplied to the consuming apparatus will be a mixture rather than a single pure gas. Thus commercial oxygen is not 100% oxygen but contains 99.6% oxygen, the balance being mainly nitrogen with some argon. Ordinarily a slight change of purity in this range is of no consequence but often it is desired to deliver a mixture of gases such as a mixture of oxygen and nitrogen of constant composition. This may be accomplished with the system described herein because it is possible to operate substantially solely with liquid phase withdrawal. Due to the difference of boiling points of gases in a mixture of gases, the composition of the gas phase or vapor in the gas space when in equilibrium with a liquefied gas mixture in the vessel 10, will differ substantially from the composition of the liquid phase; thus by complete gasification of liquid drawn from the liquid phase only, the composition of the stored liquid will remain constant and the gas mixture delivered to the service connection 34 will remain of constant composition.

Operation with liquid phase withdrawal alone is obtained by opening switch 119 and closing switch 122, making valve 29 solely responsive to pressure switch 44. Because of the high efficiency insulation of the vessel 10, and because no heat is added to the contents of the vessel 10 by the system employed for vaporizing the withdrawn liquid to produce gas for the service connection, and unless a period of complete shut-down should be of abnormally long duration, there will usually be no excessive pressure rise in the vessel 10. If, due to an abnormally long shut-down, the pressure should increase to a value for which the relief valve 25 is set, some gas will be blown off but the amount will be small because the rate of heat leak is very slow.

If desired the eduction tube 26 could be omitted and the inlet to the valve 29 could be connected to the line 35 or line 47 and thus eliminate a conduit through the insulation space 12. If repairs are to be made to valve 29, it can be isolated by closing suitable stop valves in conduit 26 not shown, and operation continued by sealing charging connection 46, opening valves 47' and 48' and closing valve 24'. Liquid then flows through conduits 35, 47, 48, valves 41, 43, conduit 31, and heater 32 to the service connection 34. Pressure switch 44 is then placed in sole control of valve 41 by closing switch 121 and opening switch 120.

What is claimed is:

1. A control system for a gas supplying apparatus of the type comprising an insulated vessel for holding a supply of liquefied gas, a service connection, liquid and gas phase passages from said vessel to said service connection for supplying gas material thereto, and liquid and gas phase flow control valves in said passages respectively, said control system comprising motor means operably connected to said control valves to open and close said control valves; a device connected to said vessel to be responsive to pressure in said vessel and operably connected with the motor means of each of said control valves said device being constructed and arranged for conditioning the motor means of the liquid phase valve to open said liquid phase valve when the pressure in said vessel is below a predetermined pressure, and for conditioning the motor means of said gas phase valve to open said gas phase valve when the pressure in said vessel is above said predetermined pressure, said device being also constructed and arranged to prevent opening of one of said valves when the other is open.

2. A control system for a gas supplying apparatus according to claim 1, which includes temperature responsive means associated with said service connection and operable to deenergize the motor means of each of said control valves when the temperature of gas in said service connection falls lower than a predetermined minimum temperature.

3. A control system for a gas supplying apparatus according to claim 1 which includes means responsive to pressure in said service connection and connected with the motor means of each of said control valves for holding both said control valves closed when the pressure in the service connection exceeds a predetermined value higher than a desired operating service pressure.

4. A control system for a gas supplying apparatus of the type comprising an insulated vessel for holding a supply of liquefied gas, a service connection, means including a passage for supplying gas material from said vessel to said service connection at a desired service pressure, means including an external vaporizer connected to the gas and liquid spaces of said vessel for building pressure, and a pressure-building valve controlling flow through said vaporizer, said control system comprising motor means directly connected to said pressure-building valve to open and close same; pressure responsive means connected in pressure communication with said vessel so as to be responsive to pressure in said vessel; operating means connected between said pressure-responsive means and said motor means to effect opening of said pressure building valve when the pressure in said vessel falls below a predetermined operating pressure and to effect closing of same when the pressure in said vessel tends to exceed said predetermined operating pressure; and means associated with said operating means to render same inoperative when it is desired to keep the pressure-building valve closed.

5. A control system for a gas supplying apparatus of the type comprising an insulated vessel for holding a supply of liquefied gas, a service connection, means including a passage for supplying gas material from said vessel to said service connection at a desired service pressure, means including an external vaporizer connected to the gas and liquid spaces of said vessel for building pressure, and a pressure-building valve controlling flow through said vaporizer, said control system comprising a motor-operated valve means in said passage to the service connection for controlling flow of gas material thereto; means responsive to pressure in said vessel and connected to operate said motor-operated valve means for opening same only when the pressure in said vessel exceeds a predetermined value above the operating pressure; a motor means connected to operate said pressure-building valve; pressure-responsive means connected in pressure communication with said vessel and operatively connected to said motor means for opening said pressure-building valve when the pressure in said vessel falls below a predetermined operating pressure and for closing same when the pressure in said vessel tends to exceed said predetermined operating pressure; and means for deenergizing both the motor means of said pressure-building valve and said motor-operated valve means.

6. A control system for a gas supplying apparatus of the type comprising an insulated vessel for holding a supply of liquefied gas, a service connection, means including a passage for supplying gas material from said vessel to said service connection at a desired service pressure, means including an external vaporizer connected to the gas and liquid spaces of said vessel for building pressure, and a pressure-building valve controlling flow through said vaporizer, said control system comprising a motor-operated valve means in said passage to the service connection for controlling flow of gas material thereto; means responsive to pressure in said vessel and connected to operate said motor-operated valve means for closing same only when the pressure in said vessel exceeds a predetermined value above the operating pressure; a motor means connected to operate said pressure-building valve; pressure-responsive means connected in pressure communication with said vessel and operatively connected to said motor means for opening said pressure-building valve when the pressure in said vessel falls below a predetermined operating pressure and for closing same when the pressure in said vessel tends to exceed said predetermined operating pressure; and means for deenergizing both the motor means of said pressure-building valve and said motor-operated valve means.

7. A control system for a gas supplying apparatus of the type comprising an insulated vessel for holding a supply of liquefied gas, a service connection, liquid and gas phase passages from said vessel to said service connection for supplying gas material thereto, and liquid and gas phase flow control valves in said passages respectively, said control system comprising electromotive means associated with each valve to open and close same; a pressure switch responsive to pressure in said vessel and having a normally closed switch portion in circuit with the electromotive means of said liquid phase valve and a normally open switch portion in circuit with the electromotive means of said gas phase valve, said pressure switch being constructed to open said normally closed switch portion and close said normally open switch portion only when the pressure in said vessel exceeds a predetermined operating pressure; and a second pressure switch responsive to pressure in said service connection having a switch portion connected normally to energize the circuits of both said electromotive means and to deenergize said circuits only when the service connection pressure exceeds a desired service pressure value by a predetermined amount.

8. A control system for a gas supplying apparatus of the type comprising an insulated vessel for holding a supply of liquefied gas, a service connection; means including a passage for supplying gas material from said vessel to said service connection at a desired service pressure, means including an external vaporizer connected to the gas and liquid spaces of said vessel for building pressure, and a pressure-building valve controlling flow through said vaporizer, said control system comprising electromotive means for opening and closing said pressure-building valve; a pressure switch responsive to pressure in said vessel having a switch element connected to close the circuit of said electromotive means only when the pressure in said vessel falls below a predetermined operating pressure, the construction and arrangement being such that the exact switch closing and opening pressures are at least close together and that closing of the switch opens the valve fully while opening of the switch closes the valve tightly.

9. A control system for a gas supplying apparatus according to claim 8 which includes an electrically operable valve means controlling flow in said passage to the service connection; a second pressure switch responsive to operating pressure for controlling said electrically operable valve means; a temperature responsive switch associated with said service connection and connected in circuit with both said first-mentioned pressure switch and said second pressure switch for opening the circuits only when the temperature of gas in said service connection falls below a predetermined minimum.

10. A control system for a gas supplying apparatus of the type comprising an insulated vessel for holding a supply of liquefied gas, a service connection, liquid and gas phase passages from said vessel to said service connection for supplying gas material thereto, and liquid and gas phase flow control valves in said passages respectively, means including an external vaporizer connected to the gas and liquid spaces of said vessel for building pressure therein, and an electrically operable pressure-building valve controlling flow through said vaporizer, said control system comprising electromotive means associated with the gas phase valve and with the liquid phase valve respectively to open and close same; a pressure switch responsive to pressure in said vessel and having a normally closed switch portion in circuit with the electromotive means of said liquid phase valve and a normally open switch portion in circuit with the electromotive means of said gas phase valve, said pressure switch being constructed to open said normally closed switch portion and close said normally open switch portion only when the pressure in said vessel exceeds a predetermined operating pressure; a second pressure switch responsive to pressure in said vessel and connected to energize said electrically operable valve means to open same when the pressure in said vessel tends to fall below the operating pressure; and a switch for controlling the supply of electrical energy to all of said pressure switches.

11. A control system for a gas supplying apparatus according to claim 10 which includes a manual off-and-on switch shunted across the normally open switch portion; and an on-and-off switch in series circuit with the electromotive means of said liquid phase valve.

12. A control system for a gas supplying apparatus according to claim 10 which includes a manual off-and-on switch shunted across the normally closed switch portion; and an on-and-off switch in series circuit with the electromotive means of said gas phase valve.

13. A control system for a gas supplying apparatus according to claim 8 which includes a third pressure switch responsive to pressure in the service connection and having a switch portion connected to normally energize the circuits of both said electromotive means and deenergize said circuits when the pressure in said service connection exceeds a predetermined value above the service pressure.

14. A control system for a gas supplying apparatus according to claim 10 which includes a closed liquid circuit having interposed therein means for heating said vaporizer and a liquid heating chamber, such circuit being arranged for holding and circulating a heating liquid; a device associated with said chamber responsive to liquid level therein and having a switch that is opened when the liquid level in said chamber is below a predetermined height; and means connecting said switch in circuit to control the supply of electric current to said pressure responsive switches.

15. A control system for a gas supplying apparatus according to claim 10 which includes a closed liquid circuit having interposed therein means for heating said vaporizer and a liquid heating chamber, such circuit being arranged for holding and circulating a heating liquid; thermostatically controlled electric heating means in said liquid heating chamber for warming the heating liquid; a device associated with said chamber responsive to liquid level therein and having a switch that is opened when the liquid level in said chamber is below a predetermined height; and means connecting said switch in circuit to control the supply of electric current to said pressure responsive switches.

16. A control system for a gas supplying apparatus of the type comprising an insulated vessel for holding a supply of liquefied gas, a service connection, means including a passage for supplying gas material from said vessel to said service connection at a desired service pressure, means including an external vaporizer connected to the gas and liquid spaces of said vessel for building pressure, and a pressure-building valve controlling flow through said vaporizer, a closed liquid circuit for heating liquid having interposed therein means for heating said vaporizer and a heater chamber, said control system comprising a plurality of electric immersion heaters in said heater chamber for warming the heating liquid; an electric current supply for said heaters; a plurality of thermostatic switches associated with said liquid circuit for response to the temperature of the liquid, one of said thermostatic switches being constructed to close its circuit only when the liquid temperature falls below a predetermined value and the others being constructed to close their circuits at successively lower temperatures; and electrical means constructed and arranged to close the circuit between said current supply and one of said immersion heaters when the corresponding one of said thermostatic switches is closed, whereby said heaters are successively energized as the temperature of the liquid falls from the predetermined value and are successively deenergized as the temperature rises to the predetermined value.

17. A control system for a gas supplying apparatus according to claim 16 which includes a pump interposed in said liquid circuit for effecting positive circulation of said liquid; a device responsive to the amount of liquid in said liquid circuit and having a switch that is opened when the liquid in the circuit is less than a predetermined amount; and means connecting said last-mentioned switch in circuit to control the supply of electric current to said thermostatic switches without affecting the operation of said pump.

RUSSELL M. THAYER.
DOUGLAS J. TAYLOR.

REFERENCES CITED

The following references are of record in the file of this patent:

UNITED STATES PATENTS

| Number | Name | Date |
| --- | --- | --- |
| 2,352,775 | Dittmer | July 4, 1944 |